United States Patent [19]

Hashimoto

[11] 4,343,882
[45] Aug. 10, 1982

[54] ELECTROPHOTOGRAPHIC BISAZO PHOTOCONDUCTOR

[75] Inventor: Mitsuru Hashimoto, Numazu, Japan

[73] Assignee: Ricoh Company, Ltd., Tokyo, Japan

[21] Appl. No.: 244,984

[22] Filed: Mar. 18, 1981

[30] Foreign Application Priority Data

Apr. 11, 1980 [JP] Japan ................... 55-47668

[51] Int. Cl.³ .......................... G03G 5/06; G03G 5/14
[52] U.S. Cl. ........................................ 430/58; 430/59; 430/71; 430/72; 430/75; 430/76; 430/78; 430/79; 260/152; 260/160; 260/164; 260/165; 260/177; 260/184
[58] Field of Search ..................... 430/58, 59, 71, 72, 430/75, 76, 78, 79; 260/152, 160, 164, 165, 177, 184

[56] References Cited

U.S. PATENT DOCUMENTS 3,467,643  9/1969  Horstmann et al. ............... 260/160
4,299,896 11/1981  Hashimoto et al. ............. 430/78 X

FOREIGN PATENT DOCUMENTS 768999  2/1957  United Kingdom ............... 260/177

Primary Examiner—Roland E. Martin, Jr.
Attorney, Agent, or Firm—Blanchard, Flynn, Thiel, Boutell & Tanis

[57] ABSTRACT

An electrophotographic photoconductor comprising, on an electroconductive support material, a photoconductive layer containing a bisazo pigment having a phenanthrenequinone substituent, which electrophotographic photoconductor exhibits relatively high photosensitivity and usefullness for electrophotographic copying.

7 Claims, 4 Drawing Figures

ELECTROPHOTOGRAPHIC BISAZO PHOTOCONDUCTOR

BACKGROUND OF THE INVENTION

The present invention relates to an electrophotographic photoconductor comprising, on an electroconductive support material, a photoconductive layer containing a bisazo pigment having a certain novel structure of substituents, which electrophotographic photoconductor exhibits relatively high photosensitivity and usefulness for electrophotographic copying.

Certain bisazo compounds are known as being useful as photoconductive materials for use in electrophotographic processes. For instance, in U.S. Pat. No. 3,898,084 there are disclosed the bisazo compounds Diane Blue (C.I. 21,180), which is chemically 3,3'-dimethoxy-4,4' diphenyl bis-(1"-azo-2" hydroxy-3"-naphthanilide), Chlorodiane Blue, which is chemically 3,3'-dichloro-4,4' diphenyl bis-(1"-azo-2" hydroxy-3"-naphthanilide), and other bisazo compounds having similar structures as those of the afore-mentioned two, but with different substituents. In that U.S. Patent, those bisazo compounds are used as charge generators, in the form of small particles in a charge transport medium of the photoconductor.

Further, U.S. Pat. No. 4,052,210 discloses a reproduction element for use in electrophotographic copying processes, comprising, on an electroconductive support material, a photoconductive layer containing dispersed in a binder a bisazo naphthol compound having a certain structure of substituents.

Of the photoconductors produced from the above-mentioned photoconductive materials, some can be used in practice, but not all of them are satisfactory for practical use in terms of their photosensitivities.

SUMMARY OF THE INVENTION

It is therefore an object of the present invention to provide an improved electrophotographic photoconductor comprising a bisazo pigment novel in structure, selected from the group consisting of bisazo pigments of the formula:

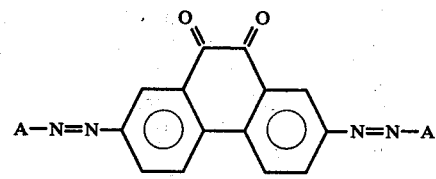

wherein substituent A of the formula is

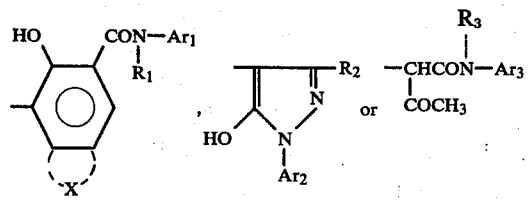

wherein X is selected from the group consisting of a hydrocarbon aromatic ring, a heterocyclic ring, substituted hydrocarbon aromatic rings and substituted heterocyclic rings; $Ar_1$ is selected from the group consisting of a hydrocarbon aromatic ring, a heterocyclic ring, substituted hydrocarbon aromatic and substituted heterocyclic rings; $Ar_2$ and $Ar_3$ are each selected from the group consisting of a hydrocarbon aromatic ring and substituted hydrocarbon aromatic rings; $R_1$ and $R_3$ are selected from the group consisting of hydrogen, lower alkyl, phenyl, substituted lower alkyl and substituted phenyl, and $R_2$ is selected from the group consisting of lower alkyl, carboxyl and ester derivatives of said carboxyl group.

According to the present invention, by use of the bisazo pigments of the above-mentioned type, the photosensitivities of the photoconductors are significantly improved, while the photoconductors retain the conventional form, i.e., a photoconductive layer containing a bisazo pigment deposited on an electroconductive support material.

According to the present invention, it can be considered that the bisazo pigments can, depending upon the content of the bisazo pigment in the photoconductor or the structure of the photoconductor, work as (i) complete photoconductive materials which form charge carriers and transport them, or (ii) charge carrier producing materials which produce charge carriers. For instance, in a dispersion type photoconductor which comprises an electroconductive support material and a photoconductive layer formed on the support material, when the bisazo pigment particles are dispersed in a resinous binder in the photoconductive layer to such an extent or in such a manner that the bisazo pigment particles touch each other throughout the photoconductor, the bisazo pigment works as a photoconductor in the first-mentioned sense.

In contrast, in the case of a photoconductor comprising an electroconductive support material and a photoconductive layer composed of the bisazo pigment and a charge transporting material, in which the particles of the bisazo pigment are dispersed in the photoconductive layer and present as individual particles not touching each other, the bisazo pigment works only as a charge carrier producing material. Further, in the case of a layered photoconductor composed of an electroconductive support material, a charge carrier producing layer containing the bisazo pigment, and a charge transporting layer, which are successively layered, the bisazo pigment also works as a charge carrier producing material in the photoconductor.

For use in the present invention, the bisazo pigments are ground to small particles with a diameter not greater than 5 μm, and preferably not greater than 2 μm, by a ball mill or by other conventional means.

In the first-mentioned type photoconductor, the dispersion type, the thickness of the photoconductive layer is in the range of about 3 μm to 50 μm, and preferably in the range of 5 μm to 20 μm. The content of the bisazo pigment in the photoconductive layer is in the range of 30 to 70 percent of the total weight of the photoconductive layer, and preferably about 50 percent.

In the second-mentioned type photoconductor, the modified dispersion type, the thickness of the photoconductive layer is in the range of about 3 μm to 50 μm, and preferably in the range of 5 μm to 20 μm. The content of the bisazo pigment is not more than 50 percent of the total weight of the photoconductive layer, and preferably not more than 20 percent.

In the third-mentioned type photoconductor, the layered type, the thickness of the charge carrier producing layer is not more than 5 μm, and preferably in the range of 0.05 μm to 1.0 μm, while the thickness of the charge transporting layer is in the range of about 3 μm to 50 μm, and preferably in the range of 5 μm to 20 μm. The content of the charge transporting material in the charge transporting layer is in the range of 10 to 95 percent of the total weight of the charge transporting layer, and preferably in the range of 30 to 90 percent of the same.

DETAILED DESCRIPTION OF THE PREFERRED EMBODIMENTS

Figure 1:
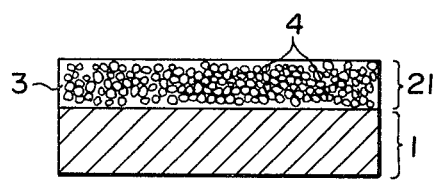
FIG. 1 is an enlarged cross sectional view of a dispersion type electrophotographic photoconductor according to the present invention.

As mentioned previously, the bisazo pigments useful in the present inventions are those having the structural formula:

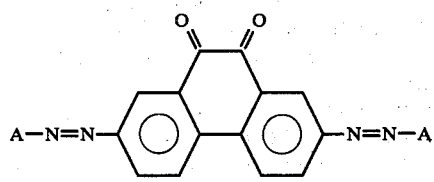

wherein substituent A of the formula is

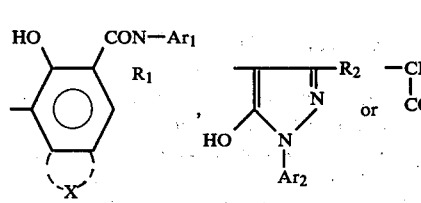

wherein

X is selected from the group consisting of non-substituted hydrocarbon aromatic rings including a benzene ring and a naphthalene ring, substituted hydrocarbon aromatic rings including substituted benzene rings and substituted naphthalene rings, non-substituted heterocyclic rings including an indole ring, a carbazole ring and a benzofuran ring, and substituted heterocyclic rings including substituted indole rings, substituted carbazole rings and substituted benzofuran rings;

$Ar_1$ is selected from the group consisting of non-substituted hydrocarbon aromatic rings including a benzene ring and a naphthalene ring, substituted hydrocarbon aromatic rings including substituted benzene rings and substituted naphthalene rings, non-substituted heterocyclic rings including a dibenzofuran ring and a carbazole ring, substituted heterocyclic rings including substituted dibenzofuran rings and substituted carbazole rings;

$Ar_2$ and $Ar_3$ are each selected from the group consisting of non-substituted hydrocarbon aromatic rings including a benzene ring and a naphthalene ring, substituted hydrocarbon aromatic rings including substituted benzene rings and substituted naphthalene rings;

$R_1$ and $R_3$ are each selected from the group consisting of hydrogen, lower alkyl, phenyl, substituted lower alkyl and substituted phenyl; and $R_2$ is selected from the group consisting of lower alkyl, carboxyl and ester derivatives of said carboxyl group.

Representative examples of the bisazo pigments for use in the present invention are listed as follows:

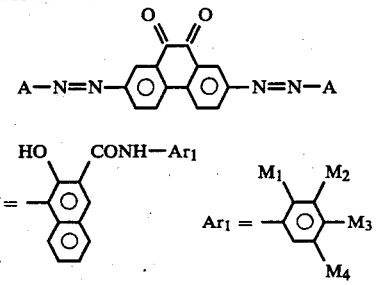

| No. | $M_1$ | $M_2$ | $M_3$ | $M_4$ |
|---|---|---|---|---|
| (1) | OCH$_3$ | H | H | H |
| (2) | H | OCH$_3$ | H | H |
| (3) | H | H | —OCH$_3$ | H |
| (4) | OC$_2$H$_5$ | H | H | H |
| (5) | H | OC$_2$H$_5$ | H | H |
| (6) | H | H | OC$_2$H$_5$ | H |
| (7) | CH$_3$ | H | H | H |
| (8) | H | CH$_3$ | H | H |
| (9) | H | H | CH$_3$ | H |
| (10) | C$_2$H$_5$ | H | H | H |
| (11) | H | C$_2$H$_5$ | H | H |
| (12) | H | H | C$_2$H$_5$ | H |
| (13) | H | H | H | H |
| (14) | Cl | H | H | H |
| (15) | H | Cl | H | H |
| (16) | H | H | Cl | H |
| (17) | Br | H | H | H |
| (18) | H | Br | H | H |
| (19) | H | H | Br | H |
| (20) | I | H | H | H |
| (21) | H | I | H | H |
| (22) | H | H | I | H |
| (23) | F | H | H | H |
| (24) | H | F | H | H |
| (25) | H | H | F | H |
| (26) | CF$_3$ | H | H | H |
| (27) | H | CF$_3$ | H | H |
| (28) | H | H | CF$_3$ | H |
| (29) | CN | H | H | H |
| (30) | H | CN | H | H |
| (31) | H | H | CN | H |
| (32) | NO$_2$ | H | H | H |
| (33) | H | NO$_2$ | H | H |
| (34) | H | H | NO$_2$ | H |
| (35) | H | H | COOH | H |
| (36) | H | H | COOC$_2$H$_5$ | H |
| (37) | H | H | N(CH$_3$)$_2$ | H |
| (38) | OCH$_3$ | H | H | OCH$_3$ |
| (39) | OC$_2$H$_5$ | H | H | OC$_2$H$_5$ |
| (40) | CH$_3$ | H | H | CH$_3$ |
| (41) | Cl | H | H | Cl |
| (42) | CH$_3$ | H | H | Cl |
| (43) | OCH$_3$ | H | OCH$_3$ | H |
| (44) | CH$_3$ | H | CH$_3$ | H |
| (45) | CH$_3$ | H | Cl | H |
| (46) | NO$_2$ | H | OCH$_3$ | H |
| (47) | H | OCH$_3$ | H | OCH$_3$ |

-continued
| | | | | |
|---|---|---|---|---|
| (48) | OCH₃ | H | H | Br |
| (49) | CH₃ | H | OCH₃ | H |
| (50) | OCH₃ | H | Cl | OCH₃ |
| (51) | OCH₃ | H | OCH₃ | Cl |
| (52) | H | H | SO₃Na | H |
| (53) | H | H | OC₄H₉(tert) | H |
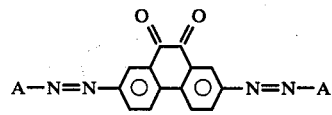
| No. | A |
|---|---|
| (54) | 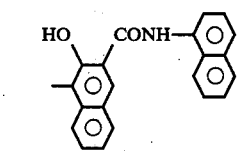 |
| (55) | 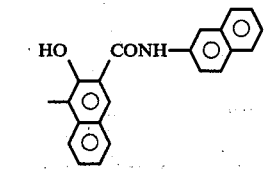 |
| (56) | 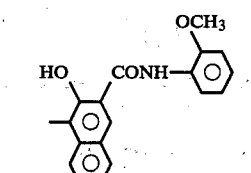 |
| (57) | 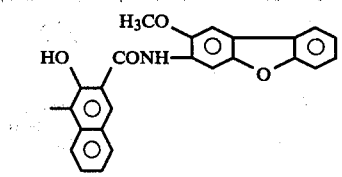 |
| (58) | 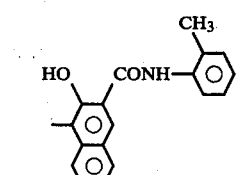 |
| (59) | 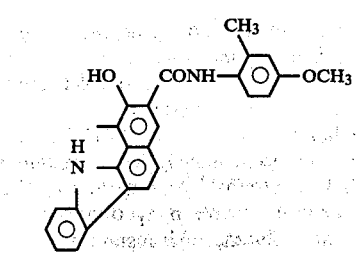 |
-continued
| No. | A |
|---|---|
| (60) | 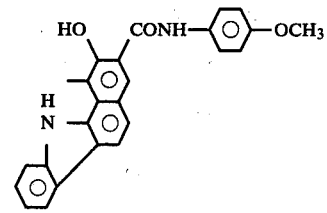 |
| (61) | 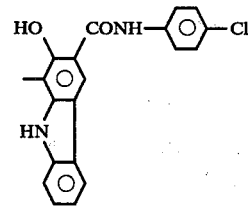 |
| (62) | 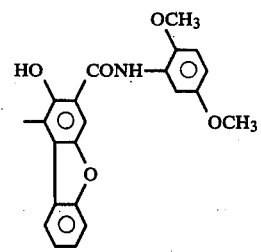 |
| (63) | 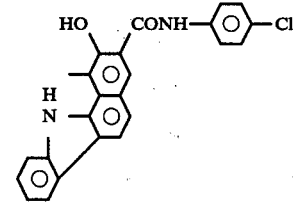 |
| (64) | 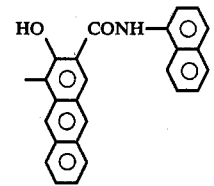 |
| (65) | 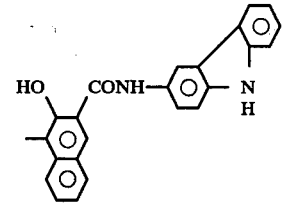 |
| (66) | 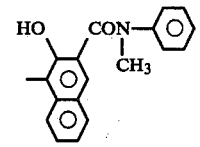 |

| No. | | |
|---|---|---|
| (67) | | 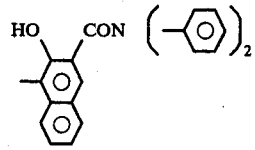 |
| (68) | | 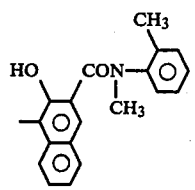 |
| (69) | | 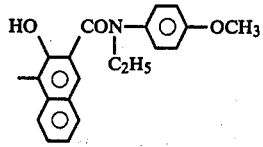 |
| (70) | | 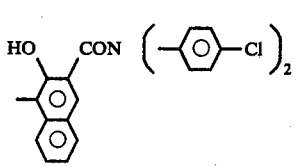 |

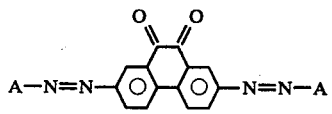

$$A = \underset{\underset{Ar_2}{|}}{\overset{R_2}{\underset{N}{\diagup}\diagdown}}\underset{HO}{N}$$

| No. | $R_2$ | $Ar_2$ |
|---|---|---|
| (71) | $CH_3$ | 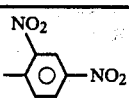 |
| (72) | $CH_3$ | 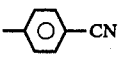—$NO_2$ |
| (73) | $CH_3$ | 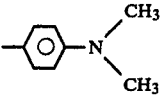—$SO_3H$ |
| (74) | $CH_3$ | 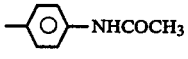 |
| (75) | $CH_3$ | —$CH_3$ |
| (76) | $CH_3$ | 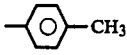—$OCH_3$ |
| (77) | $CH_3$ | 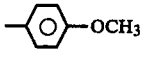—Cl |
| (78) | $CH_3$ |  |
| (79) | $CH_3$ | —⌬—CN |
| (80) | $CH_3$ | —⌬—N(CH_3)_2 |
| (81) | $CH_3$ | —⌬—NHCOCH_3 |
| (82) | COOH | 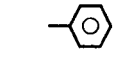 |
| (83) | COOH | 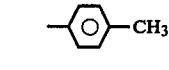—$CH_3$ |
| (84) | COOH | 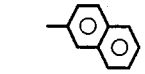—$OCH_3$ |
| (85) | $COOC_2H_5$ | 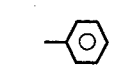 |

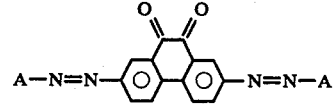

$$A = -\underset{\underset{COCH_3}{|}}{CHCON}-\underset{R_3}{Ar_3}$$

| No. | $R_3$ | $Ar_3$ |
|---|---|---|
| (86) | H | 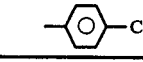 |
| (87) | H | 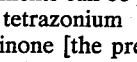—$CH_3$ |
| (88) | H | 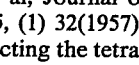 |
| (89) | $CH_3$ | 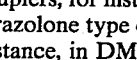 |
| (90) | —⌬—Cl | —⌬—Cl |

The above-listed bisazo pigments can be prepared by the steps of preparing the tetrazonium salt of 2,7-diamino-9,10-phenanthrenequinone [the preparation of which is reported in Kato et al, Journal of Synthetic Organic Chemistry, Japan, 15, (1) 32(1957)] by a conventional procedure and subjecting the tetrazonium salt to a coupling reaction with couplers, for instance, naphthol AS type couplers and pyrazolone type couplers, in an appropriate solvent, for instance, in DMF.

For example, bisazo pigment No. 13 can be prepared as follows:

To 80 ml of 6-N hydrochloric acid was added 4.6 g of 2,7-diamino-9,10-phenanthrenequinone. The mixture was stirred at 60° C. for about 30 minutes and was then cooled to 0° C. To the mixture, a sodium nitrite solution consisting of 2.9 g of sodium nitrite and 10 ml of water was added dropwise over a period of about 10 minutes at such a rate that the temperature of the mixture remained between 0° C. to 5° C. After completion of addition of the sodium nitrite solution, the reaction mixture, still between 0° C. to 5° C., was stirred for 20 minutes and active carbon was added thereto. The mixture was filtered. To the filtrate was added 50 ml of 42 percent tetrafluoroboric acid. Crystals separated, which were collected on a suction funnel and washed with cold water and dried under reduced pressure, whereby 9,10-phenanthrenequinone-2,7-bisdiazonium bistetrafluoroborate was obtained, which was a light-brown powder. The yield was 5.7 g (68%). The infrared spectra thereof was measured by use of a KBr tablet. The $\oplus$—N≡N bond, that is, $\nu_{N_2+}$, gave rise to infrared absorption at 2,275 $cm^{-1}$.

2.18 g of the thus prepared tetrazonium salt and 2.63 g of Naphthol AS were dissolved in 300 ml of dimethylformamide (DMF). To the solution, a sodium acetate solution consisting of 1.64 g of sodium acetate and 14 ml of water was added dropwise over a period of about 5 minutes at such a rate that the reaction mixture was kept at room temperature (about 20° C.). After addition of the sodium acetate aqueous solution, the reaction mixture was stirred at room temperature for two hours. Crystals separated, which were collected on a suction funnel and washed three times with 300 ml of DMF each time, which was heated to 80° C. The crystals were washed with water sufficiently and were then dried under reduced pressure at 80° C., whereby bisazo pigment No. 13 was obtained in the form of dark purple crystals melting above 300° C. The yield was 3.32 g (85.4%).

The results of elemental analysis of the bisazo pigment No. 13 were as follows:

|     | Found | Calculated |
| --- | --- | --- |
| C % | 73.26 | 73.27 |
| H % | 3.58 | 3.84 |
| N % | 10.38 | 10.68 |

Figure 4:
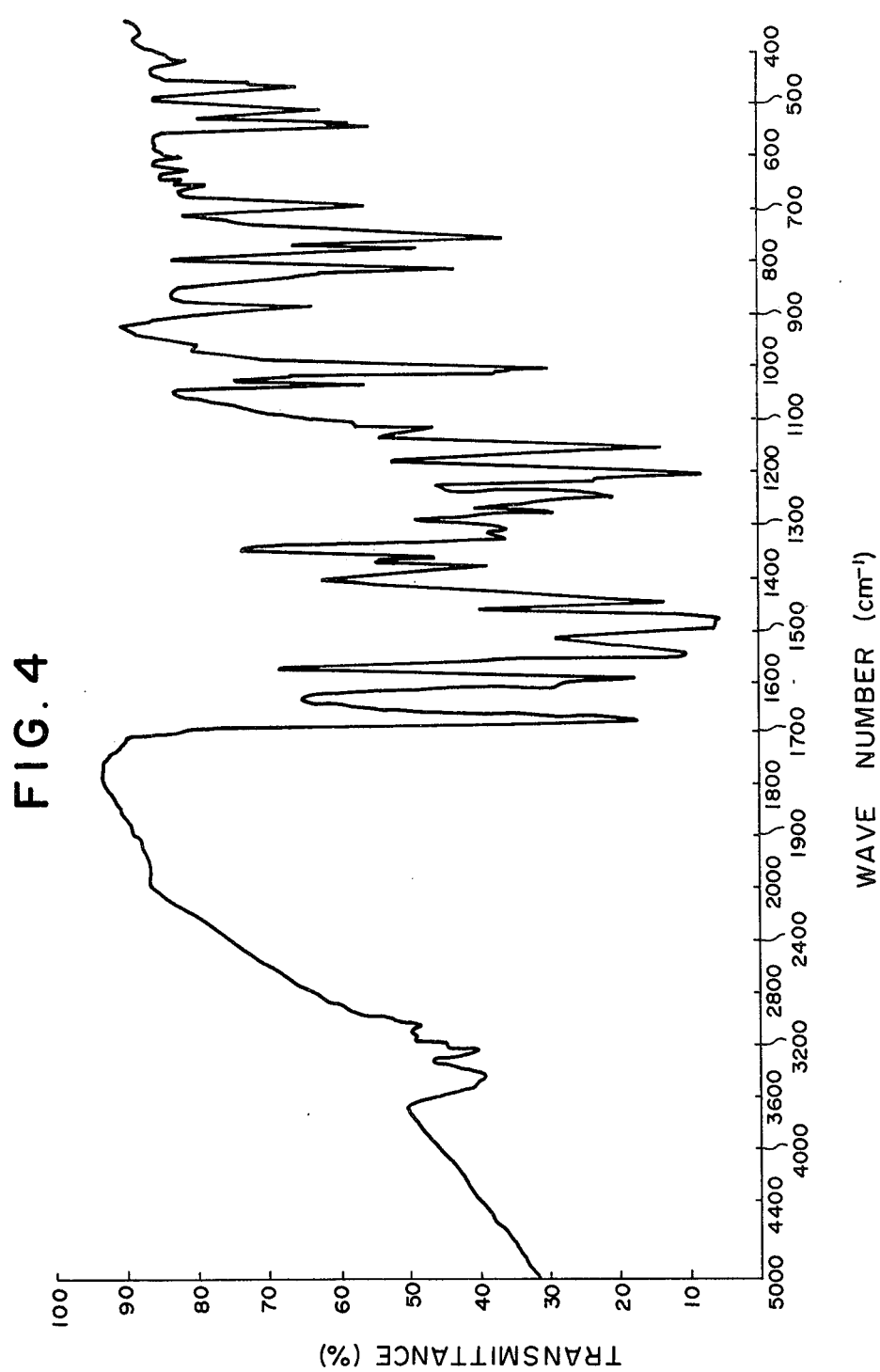
FIG. 4 is the infrared spectra of bisazo pigment No. 13 for use in the present invention.

The infrared spectra thereof, which is shown in FIG. 4, was measured by use of a KBr tablet.

The other bisazo pigments previously listed were prepared in accordance with the same procedure as in the case of bisazo pigment No. 13 by use of their respective coupling components which can be seen from the list of the bisazo pigments.

The photoconductors according to the present invention contain any of the bisazo pigments listed.

Figure 2:
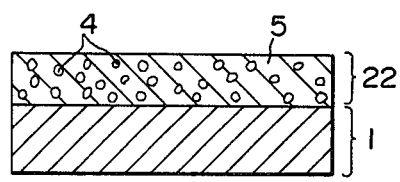
FIG. 2 is an enlarged cross sectional view of a modified dispersion type electrophotographic photoconductor according to the present invention.
Figure 3:
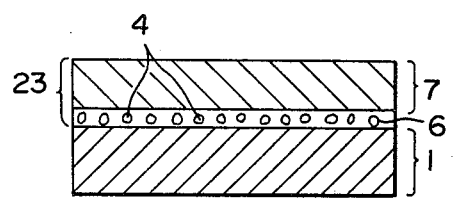
FIG. 3 is an enlarged cross sectional view of a layered type electrophotographic photoconductor according to the present invention.

Those photoconductors can be classified into three types in accordance with their constructions as shown in FIGS. 1 to 3.

Referring to FIG. 1, there is shown a photoconductor comprising an electroconductive support material 1 and a photoconductive layer 21 formed on the support material 1. The photoconductive layer 21 contains a bisazo pigment 4 and a resinous binder material 3.

For the preparation of the photoconductor as shown in FIG. 1, the bisazo pigment is ground to small particles with a diameter not greater than 5 μm, and preferably not greater than 2 μm, by a ball mill or by other conventional grinding means, and the bisazo pigment particles are dispersed in a solution of a binder agent. The bisazo pigment dispersion is applied to the electroconductive support material by a conventional method, for instance, by use of a doctor blade or wire bar, and is then dried.

The thickness of the photoconductive layer 21 is in the range of approximately 3 μm to 50 μm, and preferably in the range of 5 μm to 20 μm.

In the photoconductor as shown in FIG. 1, the photoconductive layer 2 contains 30 to 70 percent of a bisazo compound, and preferably about 50 percent by weight of the same.

In this photoconductor, the bisazo pigment particles are present in contact with each other continuously through the photoconductive layer, from the outer surface of the photoconductor layer to the electroconductive support material. Thus, it is considered that the bisazo pigment works as a photoconductive material, forming charge carriers necessary for the light-decay of the photoconductor and transporting the charge carriers across the photoconductive layer 2. In this sense, apparently, the greater the content of the bisazo pigment in the photoconductive layer, the better the photoconductor in terms of its photoconductive properties. However, in view of the required strength and photosensitivity of the photoconductor, it is most preferable that the photoconductive layer contain approximately 50 percent by weight of the bisazo compound.

Referring to FIG. 2, there is shown another photoconductor comprising an electroconductive support material 1 and a photoconductive layer 22 formed on the support material 1. The photoconductive layer 22 comprises the bisazo pigment 4 and a charge transporting medium which is a mixture of a charge transporting material and a resinous binder material.

For the preparation of the photoconductor as shown in FIG. 2, the bisazo pigment is ground to small particles with a diameter not greater than 5 μm, and preferably not greater than 2 μm. The finely ground bisazo pigment is dispersed in a solution of a charge transporting material and a binder agent. The content of the bisazo pigment in the photoconductive layer 22 is 50 weight percent or less, and preferably 20 weight percent or less, while the content of the charge transporting material is in the range of 10 to 95 weight percent, and preferably in the range of 30 to 90 weight percent. The dispersion is applied to an electroconductive support material and is then dried.

The thickness of the photoconductive layer 22 in FIG. 2 is in the range of approximately 3 μm to 50 μm, and preferably in the range of 5 μm to 20 μm.

In the photoconductor as shown in FIG. 2, the charge transporting material forms a charge transporting medium in combination with the binder material and, when necessary, a plasticizer is added thereto, while the bisazo pigment works as the charge carrier producing material. In this photoconductor, the charge carriers which are required for the light-decay of the photoconductor are produced by the bisazo pigment, while the produced charge carriers are transported through the charge transporting medium.

Furthermore, in the photoconductor in FIG. 2, it is required that the absorption wavelength range of the charge transporting medium and that of the employed bisazo pigment not overlap. More specifically, when visible light is employed for electrostatic latent image formation, it is required that the charge transporting medium be transparent with respect to visible light, transmitting visible light without absorption thereof, in order that enough visible light reaches the surface of the bisazo pigment and causes the bisazo pigment to produce charge carriers efficiently.

When a photoconductor which is photosensitive only in a particular wavelength range is prepared, the charge transporting medium is prepared so as to absorb all incident energy except that of the particular wavelength range, functioning as a band-pass type filter.

In any case, it is a fundamental requirement that the absorption wavelength range of the charge transporting medium and that of the employed bisazo pigment not overlap in the particular absorption wavelength range corresponding to the desired photosensitive range of the photoconductor.

Referring to FIG. 3, there is shown a further photoconductor which is a modification of the second-mentioned photoconductor. In this photoconductor, a photoconductive layer 23 comprises a charge carrier producing layer 6 consisting essentially of the bisazo pigment 4, and a charge transporting layer 7.

For the preparation of the photoconductor as shown in FIG. 3, the bisazo pigment is deposited under reduced pressure on an electroconductive support material or the bisazo pigment is ground to small particles with a diameter not greater than 5 $\mu$m, and preferably not greater than 2 $\mu$m, and is then dispersed in a solvent, when necessary, with addition of a binder agent thereto. The dispersion is applied to the electroconductive support material and is then dried. When neccessary, the surface of the bisazo pigment layer is polished or its thickness is adjusted to an appropriate thickness by buffing the bisazo pigment layer or by other conventional methods. Thereafter, a solution of a charge transporting material and a binder agent is applied to the bisazo pigment layer and is then dried. Thus, a layered photoconductor as shown in FIG. 3 can be prepared.

In the photoconductor as shown in FIG. 3, the thickness of the charge carrier producing layer is 5 $\mu$m or less, and preferably in the range of 0.05 $\mu$m to 1.0 $\mu$m, while the thickness of the charge transporting layer 7 is in the range of approximately 3 $\mu$m to 50 $\mu$m, and preferably in the range of 5 $\mu$m to 20 $\mu$m.

In the photoconductor as shown in FIG. 3, the content of the charge transporting material in the charge transporting layer is in the range of 10 to 95 weight percent, and preferably in the range of 30 to 90 weight percent.

In the photoconductor as shown in FIG. 3, light that passes through the charge transporting layer 7 reaches the charge carrier producing layer 6, in which charge carrier producing layer 6 charge carriers are produced by the bisazo pigment. The charge transporting layer 7 receives the thus produced charge carriers injected thereto and transports the same. Therefore, the photoconductor as shown in FIG. 3 is the same as that shown in FIG. 2 in the sense that charge carriers required for the light-decay of the photoconductor are generated by the bisazo pigment and the charge carriers are transported through the charge transporting medium.

When preparing the photoconductors in FIGS. 1 through 3, a plasticizer can be employed together with a binder agent.

As the electroconductive support material for use in the photoconductors according to the present invention, a metal plate or metal foil, for example, an aluminum plate or aluminum foil; a metal-evaporated plastic film, for example, an aluminum-evaporated plastic film; or paper treated so as to be electroconductive, can be employed.

As the binder materials for use in the present invention, the following resins can be employed: condensation resins, such as polyamide resins, polyurethane resins, polyester resins, epoxy resins, polyketone resins, polycarbonate resins; vinyl polymers, such as polyvinylketone resins, polystyrene, poly-N-vinylcarbozole, polyacrylamide resins, and other electrically insulating and adhesive resins.

As the plasticizers for use in the present invention, halogenated paraffin, polybiphenyl chloride, dimethylnaphthalene and dibutyl phthalate can be employed.

As the charge transporting materials for use in the present invention, the following polymers and monomers can be employed: vinyl polymers, such as poly-N-vinylcarbozole, halogenated N-vinylcarbozole, polyvinyl pyrene, polyvinyl indoloquinoxaline, polyvinyl dibenzothiophene, polyvinyl anthracene, polyvinyl acridine; condensation resins, such as pyrene-formaldehyde resins, bromopyrene-formaldehyde resins, ethylcarbazole-formaldehyde resins, chloroethylcarbazoleformaldehyde resins; monomers, such as fluorenone, 2-nitro-9-fluorenone, 2,7-dinitro-9-fluorenone, 2,4,7-trinitro-9-fluorenone, 2,4,5,7-tetranitro-9-fluorenone, 4H-indeno[1,2-b]thiophene-4-on, 2-nitro-4H-indeno[1,2-b]thiophene-4-on, 2,6,8-trinitro-4H-indeno[1,2-b]thiophene-4-on, 8H-indeno [2,1-b]thiophene-8-on, 2-nitro-8H-indeno[2,1-b]thiophene-8-on, 2-bromo-6,8-dinitro-4H-indeno[1,2-b]thiophene, 6,8-dinitro-4H-indeno[1,2-b]thiophene, 2-nitrodibenzothiophene, 2,8-dinitrodibenzothiophene, 3-nitrodibenzothiophene-5-oxide, 3,7-dinitrodibenzothiophene-5-oxide, 1,3,7-trinitrodibenzothiophene-5,5-dioxide, 3-nitrodibenzothiophene-5,5-dioxide, 3,7-dinitrodibenzothiophene 5,5-dioxide, 4-dicyanomethylene-4H-indeno [1,2-b]thiophene, 6,8-dinitro-4-dicyanomethylene-4H-indeno [1,2-b]thiophene, 1,3,7,9-tetranitrobenzo[c]cinnoline-5-oxide, 2,4,10-trinitrobenzo[c]cinnoline-6-oxide, 2,4,8-trinitrobenzo [c]cinnoline-6-oxide, 2,4,8-trinitrothioxanthone, 2,4,7-trinitro-9-dicyanomethylenefluorene, tetrachlorophthalic anhydride, 1-bromopyrene, 1-methylpyrene, 1-ethylpyrene, 1-acetylpyrene, carbazole, N-ethylcarbazole, N-$\beta$-chloroethylcarbazole, N-$\beta$-hyroxyethylcarbazole, 2-phenylindole, 2-phenylnaphthalene, 2,5-bis(4-diethylaminophenyl)1,3,4-triazole, 1-phenyl-3-(4-diethylaminostyryl)-5-(4-diethylaminophenyl)pyrazoline, 2-phenyl-4-(4-diethylaminophenyl)methane, 3,6-bis(dibenzylamino)-9-ethylcarbazole, 1,2-bis(4-methoxystyryl)benzene, 1,2-bis-(4-methylstyryl)-benzene, 1,2-bis(3-methoxystyryl)-benzene, 1,2-bis(4-chlorostyryl)-benzene, 9-(4-diethylaminostyryl)-anthracene, 3-formyl-9-ethylcarbazole 1-methyl-1-pheylhydrazone, 3-formlyl-9-ethylcarbozole 1-benzyl-1-phenylhydrazone, 4-diethylaminobenzaldehyde 1-methy-1-phenylhydrazone, 4-methoxybenzaldehyde 1-methy-1-phenyhydrazone, 4-diethylaminobenzaldehyde 1,1-diphenylhydrazone, 4-diethylaminobenzaldehyde 1-methyl-1-benzylhydrazone, 4-methoxybenzaldehyde 1-phenyl-1-benzylhydrazone and 1,1-bis(4-dibenzylaminophenyl)propane.

These charge transporting materials can be employed solely or in combination with two or more other charge transporting materials.

In the photoconductors according to the present invention, an adhesive layer or a barrier layer can be placed between the electroconductive support material and the photoconductive layer when necessary. The materials suitable for preparing the adhesive layer or barrier layer are polyamide resins, nitrocellulose and aluminum oxide. It is preferable that the adhesive layer or barrier layer be 1 μm thick or less.

Copying by use of the photoconductors according to the present invention can be performed by the steps of charging the surface of the photoconductive layer, and exposing the charged surface to form a latent electrostatic image and developing the latent image with developer. When necessary, the developed image is transferred to paper or other materials.

EXAMPLE 1

This is an example of an electrophotographic photoconductor according to the present invention, in which the afore-mentioned bisazo pigment No. 13 is employed.

A mixture of 1 part by weight of a polyester resin (Trade Name: Polyester Adhesive 49000 made by Du Pont), 1 part by weight of the bisazo pigment No. 13, and 26 parts by weight of tetrahydrofuran was ground in a ball mill. This dispersion was coated on an aluminum-evaporated polyester film by a doctor blade and was then dried at 100° C. for 10 minutes, so that a photoconductive layer 7 μm thick was formed on the aluminum-evaporated polyester film, forming an electrophotographic photoconductor of the type as shown in FIG. 1.

The photoconductive layer surface of the electrophotographic photoconductor was charged negatively in the dark under application of −6 KV of corona charge for 20 seconds by a commercially available electrostatic copying sheet testing apparatus and was then allowed to stand in the dark for 20 seconds without applying any charge thereto, and the surface potential Vpo (V) of the photoconductor was measured. The photoconductor was then illuminated by a tungsten lamp in such a manner that the illuminance on the illuminated surface of the photoconductor was 20 lux, and the exposure $E_{\frac{1}{2}}$ (lux·sec) required to reduce the initial surface potential Vpo (V) to ½ the initial surface potential Vpo (V) was measured. The result showed that Vpo=−205 V and $E_{\frac{1}{2}}$ was 5.4 lux·sec.

EXAMPLE 2

A mixture of 10 parts by weight of the same polyester resin as that employed in Example 1, 10 parts by weight of 2,4,7-trinitro-fluorenone, 10 parts by weight of the bisazo pigment No. 13 and 198 parts by weight of tetrahydrofuran was ground in a ball mill. The thus prepared dispersion was coated on an aluminum-evaporated polyester film by a doctor blade and was then dried at 100° C. for 10 minutes, so that a photoconductive layer 10 μm thick was formed on the aluminum-evaporated polyester film, forming an electrophotographic photoconductor of the type as shown in FIG. 2.

Vpo and $E_{\frac{1}{2}}$ of this photoconductor were measured in the same manner as that in Example 1. The result showed that Vpo=−730 V and $E_{\frac{1}{2}}$ was 2.0 lux·sec.

EXAMPLE 3

A mixture of 10 parts by weight of the same polyester resin as that employed in Example 1, 10, parts by weight of 2,5-bis(4-diethylaminophenyl)-1,3,4-oxadiazole, 10 parts by weight of the bisazo pigment No. 13 and 198 parts by weight of tetrahydrofuran was ground in a ball mill. The thus prepared dispersion was coated on an aluminum-evaporated polyester film by a doctor blade and was then dried at 120° C. for 10 minutes, so that a photoconductive layer 12 μm thick was formed on the aluminum-evaporated polyester film, forming an electrophotographic photoconductor of the type as shown in FIG. 2.

The photoconductive layer surface of the electrophotographic photoconductor was charged positively in the dark under application of +6 KV of corona charge for 20 seconds by a commercially available electrostatic copying sheet testing apparatus and was then allowed to stand in the dark for 20 seconds without applying any charge thereto, and the surface potential Vpo (V) of the photoconductor was measured. The photoconductor was then illuminated by a tungsten lamp in such a manner that the illuminance on the illuminated surface of the photoconductor was 20 lux, and the exposure $E_{\frac{1}{2}}$ (lux·sec) required to reduce the initial surface potential Vpo (V) to ½ the initial surface potential Vpo (V) was measured. The result showed that Vpo=990 V and $E_{\frac{1}{2}}$ was 1.8 lux·sec.

EXAMPLE 4

A mixture of 76 parts by weight of the bisazo pigment No. 13, 1260 parts by weight of a polyester resin tetrahydrofuran solution containing a polyester resin (Vylon 200 made by Toyobo Company, Ltd.), in which the content of the solid component is 2 weight percent, and 3700 parts by weight of tetrahydrofuran was ground in a ball mill. The thus prepared dispersion was coated on an aluminum surface side of an aluminum-evaporated polyester film by a doctor blade and was then dried at room temperature, so that a charge carrier producing layer about 1 μm thick was formed on the aluminum-evaporated polyester film.

Furthermore, two parts by weight of 2,5-bis(4-diethylaminophenyl)-1,3,4-oxadiazole, two parts by weight of a polycarbonate resin (Trade Name: Panlite K 1300 made by Teijin Limited) and 16 parts by weight of tetrahydrofuran were mixed to form a dispersion. This dispersion was coated on the charge carrier producing layer by a doctor blade and was then dried at 80° C. for 2 minutes and then at 100° C. for 5 minutes, so that a charge transporting layer about 15 μm thick was formed on the charge carrier producing layer, whereby a layered type photoconductor as shown in FIG. 3 was prepared.

Vpo and $E_{\frac{1}{2}}$ of this photoconductor were measured in the same manner as that in Example 1. The result showed that Vpo=−1020 and $E_{\frac{1}{2}}$ was 2.9 lux·sec.

EXAMPLES 5, 6 AND 7

In Example 4, instead of 2,5-bis(4-diethylaminophenyl)1,3,4-oxadiazole, the charge transporting materials listed in Table 1 were respectively employed and three photoconductors were prepared. Vpo and $E_{\frac{1}{2}}$ of each of the photoconductors were measured in the same manner as in Example 1. The results are shown in Table 1.

COMPARATIVE EXAMPLES 1 TO 9

For comparison with the photoconductors according to the present invention, in Examples 5, 6 and 7, the bisazo pigment No. 13 was replaced with Diane Blue (C.I. 21,180), Chlorodiane Blue and β-copper phthalocyanine, which are conventionally known as charge carrier producing pigments. In the comparative examples, the photoconductors were prepared by use of the same charge transporting materials as those employed in Examples 5, 6 and 7, and their respective Vpo and $E_{\frac{1}{2}}$ were measured in the same manner as in Example 4.

The results are shown in Table 2. As can be seen from the results, the photoconductors employing the bisazo pigment according to the present invention are far better in photosensitivity than those in the comparative photoconductors.

EXAMPLES 8 TO 30

In Example 4, the bisazo pigment No. 13 which was employed in the charge carrier producing layer was replaced with the bisazo pigments listed in Table 3, and 2,5-bis(4-diethylaminophenyl)-1,3,4-oxadiazole which was employed in the charge transporting layer was replaced with the charge transporting materials listed in Table 3. The photosensitivity of each of the thus prepared photoconductors was measured in the same manner as that in Example 1. The results are shown in Table 3.

TABLE 1

Example No. 5
Bisazo Pigment No.     13
Charge Transporting Material

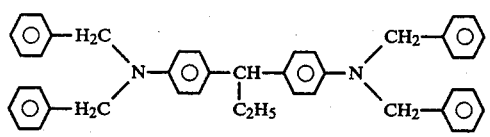

Vpo (Volt)     1120
E ½ (Lux · Second)     3.1

Example No. 6
Bisazo Pigment No.     13
Charge Transporting Material

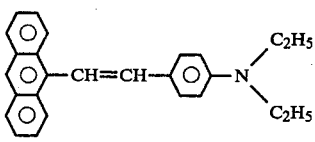

Vpo (Volt)     606
E ½ (Lux · Second)     1.9

Example No. 7
Bisazo Pigment No.     13
Charge Transporting Material

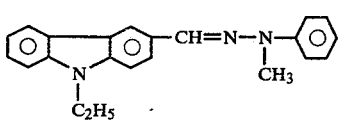

Vpo (Volt)     595
E ½ (Lux · Second)     2.2

TABLE 2

Comparative Example No. 1
Comparative Pigment     Diane Blue (C.I. 21,180)
Charge Transporting Material

TABLE 2-continued

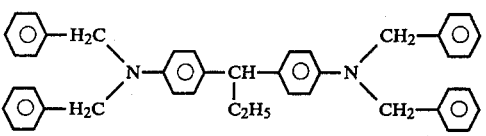

Vpo (Volt)     1156
E ½ (Lux · Second)     13.5

Comparative Example No. 2
Comparative Pigment     Diane Blue (C.I. 21,180)
Charge Transporting Material

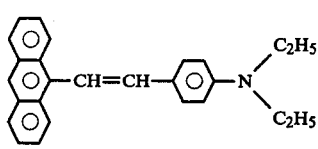

Vpo (Volt)     1086
E ½ (Lux · Second)     12.3

Comparative Example No. 3
Comparative Pigment     Diane Blue (C.I. 21,180)
Charge Transporting Material

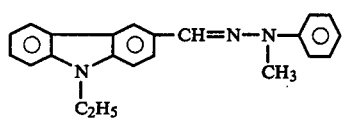

Vpo (Volt)     1083
E ½ (Lux · Second)     12.5

Comparative Example No. 4
Comparative Pigment     Chlorodiane Blue
Charge Transporting Material

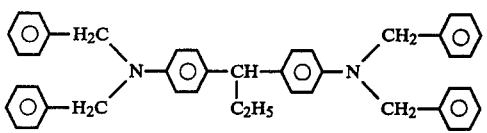

Vpo (Volt)     964
E ½ (Lux · Second)     27.5

Comparative Example No. 5
Comparative Pigment     Chlorodiane Blue
Charge Transporting Material

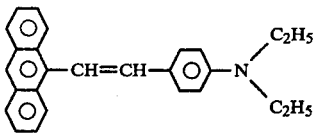

Vpo (Volt)     753
E ½ (Lux · Second)     4.3

Comparative Example No. 6
Comparative Pigment     Chlorodiane Blue
Charge Transporting Material

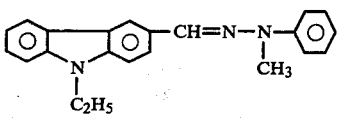

Vpo (Volt)     693

TABLE 2-continued

E ½ (Lux · Second)　　　　　　　5.9

Comparative Example No. 7
Comparative Pigment　　β-Copper Phthalocyanine
Charge Transporting Material

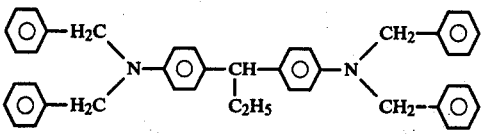

Vpo (Volt)　　　　　　　736
E ½ (Lux · Second)　　　5.8

Comparative Example No. 8
Comparative Pigment　　β-Copper Phthalocyanine
Charge Transporting Material

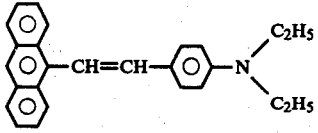

Vpo (Volt)　　　　　　　711
E ½ (Lux · Second)　　　5.4

Comparative Example No. 9
Comparative Pigment　　β-Copper Phthalocyanine
Charge Transporting Material

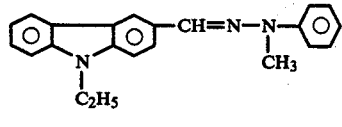

Vpo (Volt)　　　　　　　682
E ½ (Lux · Second)　　　4.4

TABLE 3

Example No. 8
Bisazo Pigment No.　　　1
Charge Transporting Material

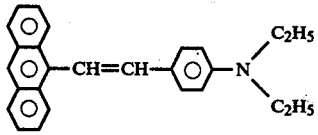

Vpo (Volt)　　　　　　　720
E ½ (Lux · Second)　　　2.0

Example No. 9
Bisazo Pigment No.　　　5
Charge Transporting Material

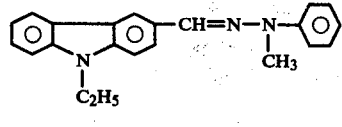

Vpo (Volt)　　　　　　　630
E ½ (Lux · Second)　　　2.1

Example No. 10
Bisazo Pigment No.　　　7
Charge Transporting Material

TABLE 3-continued

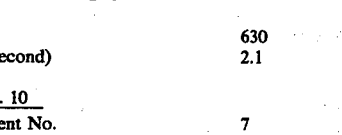

Vpo (Volt)　　　　　　　1150
E ½ (Lux · Second)　　　2.8

Example No. 11
Bisazo Pigment No.　　　9
Charge Transporting Material

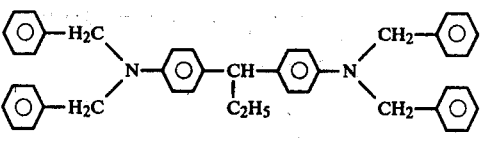

Vpo (Volt)　　　　　　　1010
E ½ (Lux · Second)　　　3.0

Example No. 12
Bisazo Pigment No.　　　10
Charge Transporting Material

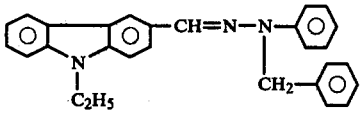

Vpo (Volt)　　　　　　　890
E ½ (Lux · Second)　　　2.1

Example No. 13
Bisazo Pigment No.　　　12
Charge Transporting Material

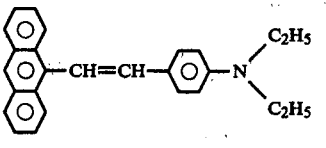

Vpo (Volt)　　　　　　　780
E ½ (Lux · Second)　　　2.0

Example No. 14
Bisazo Pigment No.　　　14
Charge Transporting Material

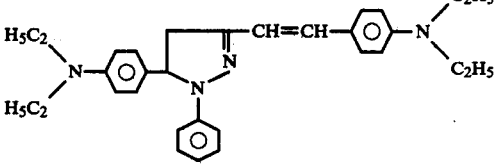

Vpo (Volt)　　　　　　　550
E ½ (Lux · Second)　　　2.8

Example No. 15
Bisazo Pigment No.　　　17
Charge Transporting Material

TABLE 3-continued

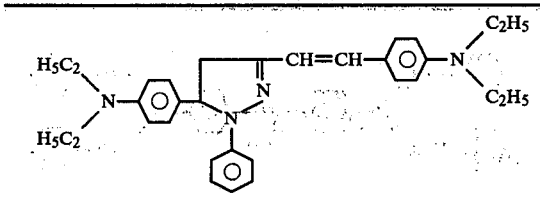

| | |
|---|---|
| Vpo (Volt) | 420 |
| E ½ (Lux · Second) | 2.5 |

Example No. 16
Bisazo Pigment No. 21
Charge Transporting Material

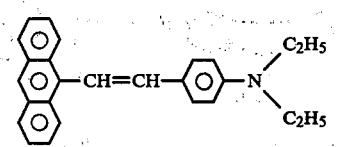

| | |
|---|---|
| Vpo (Volt) | 830 |
| E ½ (Lux · Second) | 3.1 |

Example No. 17
Bisazo Pigment No. 23
Charge Transporting Material

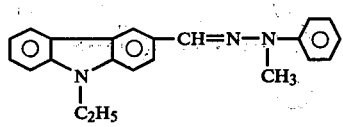

| | |
|---|---|
| Vpo (Volt) | 930 |
| E ½ (Lux · Second) | 2.2 |

Example No. 18
Bisazo Pigment No. 28
Charge Transporting Material

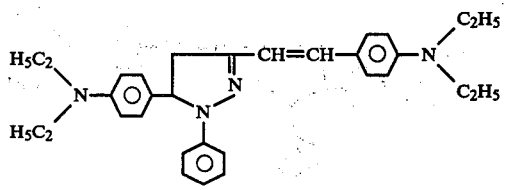

| | |
|---|---|
| Vpo (Volt) | 580 |
| E ½ (Lux · Second) | 2.9 |

Example No. 19
Bisazo Pigment No. 33
Charge Transporting Material

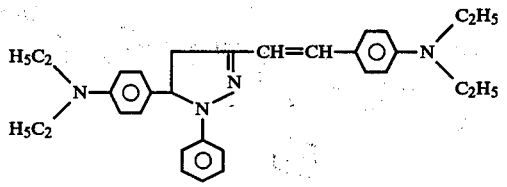

| | |
|---|---|
| Vpo (Volt) | 690 |
| E ½ (Lux · Second) | 2.2 |

Example No. 20
Bisazo Pigment No. 38
Charge Transporting Material

TABLE 3-continued

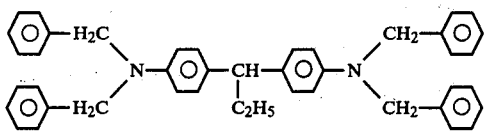

| | |
|---|---|
| Vpo (Volt) | 1130 |
| E ½ (Lux · Second) | 3.1 |

Example No. 21
Bisazo Pigment No. 40
Charge Transporting Material

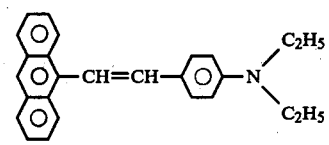

| | |
|---|---|
| Vpo (Volt) | 930 |
| E ½ (Lux · Second) | 2.1 |

Example No. 22
Bisazo Pigment No. 43
Charge Transporting Material

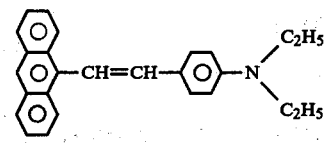

| | |
|---|---|
| Vpo (Volt) | 875 |
| E ½ (Lux · Second) | 2.3 |

Example No. 23
Bisazo Pigment No. 44
Charge Transporting Material

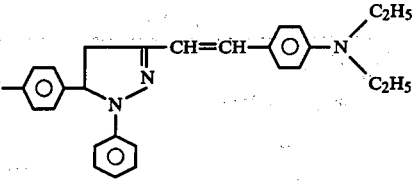

| | |
|---|---|
| Vpo (Volt) | 620 |
| E ½ (Lux · Second) | 3.0 |

Example No. 24
Bisazo Pigment No. 50
Charge Transporting Material

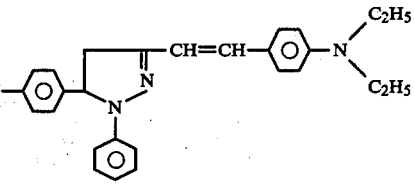

| | |
|---|---|
| Vpo (Volt) | 650 |
| E ½ (Lux · Second) | 3.1 |

Example No. 25
Bisazo Pigment No. 51
Charge Transporting Material

TABLE 3-continued

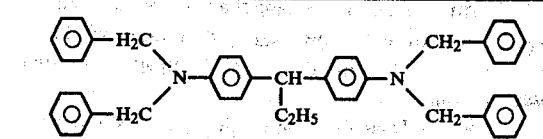

| | |
|---|---|
| Vpo (Volt) | 1120 |
| E ½ (Lux · Second) | 2.0 |

Example No. 26

| | |
|---|---|
| Bisazo Pigment No. | 54 |
| Charge Transporting Material | |

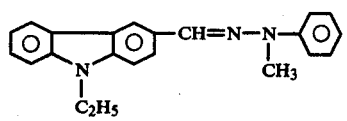

| | |
|---|---|
| Vpo (Volt) | 930 |
| E ½ (Lux · Second) | 2.5 |

Example No. 27

| | |
|---|---|
| Bisazo Pigment No. | 58 |
| Charge Transporting Material | |

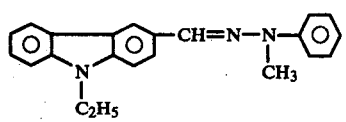

| | |
|---|---|
| Vpo (Volt) | 880 |
| E ½ (Lux · Second) | 2.1 |

Example No. 28

| | |
|---|---|
| Bisazo Pigment No. | 60 |
| Charge Transporting Material | |

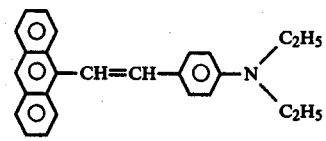

| | |
|---|---|
| Vpo (Volt) | 930 |
| E ½ (Lux · Second) | 2.5 |

Example No. 29

| | |
|---|---|
| Bisazo Pigment No. | 61 |
| Charge Transporting Material | |

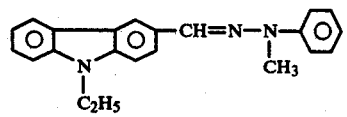

| | |
|---|---|
| Vpo (Volt) | 880 |
| E ½ (Lux · Second) | 1.8 |

Example No. 30

| | |
|---|---|
| Bisazo Pigment No. | 64 |
| Charge Transporting Material | |

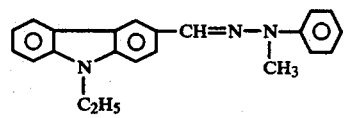

| | |
|---|---|
| Vpo (Volt) | 895 |

TABLE 3-continued

| | |
|---|---|
| E ½ (Lux · Second) | 1.7 |

What is claimed is:

1. An electrophotographic photoconductor wherein said photoconductive layer comprises a charge carrier producing layer comprising said bisazo pigment, formed on said electroconductive support material, and a charge transporting layer formed on said charge carrier producing layer, containing a charge transporting material, the thickness of said charge carrier producing layer being not more than 5 μm and that of said charge transporting layer being in the range of about 3 μm to 50 μm.

2. An electrophotographic photoconductor as claimed in claim 1, wherein said charge carrier producing layer comprises said bisazo pigment deposited on said electroconductive support material under reduced pressure.

3. An electrophotographic photoconductor comprising an electroconductive support material having thereon a photoconductive layer containing a bisazo pigment having the general formula

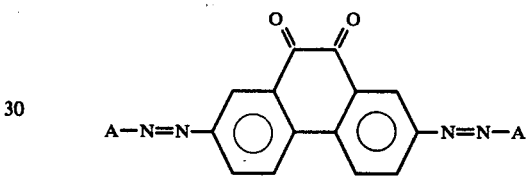

wherein substituent A of the formula is

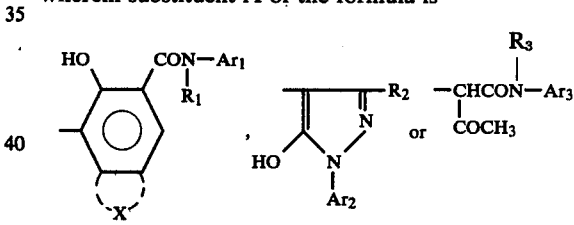

wherein X is selected from the group consisting of a hydrocarbon aromatic ring, a heterocyclic ring, substituted hydrocarbon aromatic rings and substituted heterocyclic rings; $Ar_1$ is selected from the group consisting of a hydrocarbon aromatic ring, a heterocyclic ring, substituted hydrocarbon aromatic and substituted heterocyclic rings; $Ar_2$ and $Ar_3$ are each selected from the group consisting of a hydrocarbon aromatic ring and substituted hydrocarbon aromatic rings; $R_1$ and $R_3$ are selected from the group consisting of hydrogen, lower alkyl, phenyl, substituted lower alkyl and substituted phenyl; and $R_2$ is selected from the group consisting of lower alkyl, carboxyl and ester derivatives of said carboxyl group.

4. An electrophotographic photoconductor as claimed in claim 1, wherein X is selected from the group consisting of a benzene ring, substituted benzene rings, a napthalene ring, substituted naphthalene rings, a carbazole ring, substituted carbazole rings, an indole ring, substituted indole rings, a benzofuran ring and substituted benzofuran rings; $Ar_1$ is selected from the group consisting of a benzene ring, substituted benzene rings, a napthalene ring, substituted napthalene rings, a dibenzofuran ring, substituted dibenzofuran rings, a carbazole ring and substituted carbazole rings; and $Ar_2$ and $Ar_3$ are each selected from the group consisting of a benzene ring and substituted benzene rings.

5. An electrophotographic photoconductor as claimed in claim 1, wherein said photoconductive layer contains dispersed in a binder said bisazo pigment in the form of particles of less than 5 microns in diameter in the range of 30 to 70 percent of the total weight of said photoconductive layer, the thickness of said photoconductive layer being in the range of 3 μm to 50 μm.

6. An electrophotographic photoconductor as claimed in claim 1, wherein said photoconductive layer contains (i) dispersed in a binder said bisazo pigment in the form of particles of less than 5 μm in diameter in the range of not more than 50 percent of the total weight of said photoconductive layer and (ii) a charge carrier transporting material.

7. An electrophotographic photoconductor as claimed in claim 5, wherein said charge carrier producing layer contains dispersed in a binder resin said bisazo pigment in the form of particles of less than 5 μm in diameter.

* * * * *

UNITED STATES PATENT AND TRADEMARK OFFICE
CERTIFICATE OF CORRECTION

PATENT NO. : 4 343 882
DATED : August 10, 1982
INVENTOR(S) : Mitsuru Hashimoto

It is certified that error appears in the above-identified patent and that said Letters Patent is hereby corrected as shown below:

Column 22, line 6; after "photoconductor" insert ---as claimed in Claim 3,---.

Column 22, line 60; "claim 1" is changed to read ---claim 3---.

Column 23, line 5; "claim 1" is changed to read ---claim 3---.

Column 23, line 12; "claim 1" is changed to read ---claim 3---.

Column 24, line 8; "claim 5" is changed to read ---claim 1---.

Signed and Sealed this

Eleventh Day of October 1983

[SEAL]

Attest:

GERALD J. MOSSINGHOFF

Attesting Officer   Commissioner of Patents and Trademarks